United States Patent [19]

Kanai et al.

[11] Patent Number: 4,566,718
[45] Date of Patent: Jan. 28, 1986

[54] SUSPENSION AND STEERING CONTROL OF MOTOR VEHICLES

[75] Inventors: Seita Kanai; Hirotaka Kanazawa, both of Hiroshima, Japan

[73] Assignee: Mazda Motor Corporation, Hiroshima, Japan

[21] Appl. No.: 555,962

[22] Filed: Nov. 29, 1983

[30] Foreign Application Priority Data

Nov. 30, 1982 [JP] Japan .................................. 57-211016
Dec. 16, 1982 [JP] Japan .................................. 57-220987
Dec. 16, 1982 [JP] Japan .................................. 57-220988

[51] Int. Cl.[4] .............................................. B60G 17/08
[52] U.S. Cl. ................................... 280/708; 74/498; 180/141; 280/6 R; 280/707
[58] Field of Search ............... 280/708, 707, 714, 772, 280/DIG. 1, 6 R, 6 H, 6.1; 180/41, 141, 142 A, 133; 364/424; 74/498

[56] References Cited

U.S. PATENT DOCUMENTS

| 3,042,392 | 7/1962 | Schmitz et al. | 280/708 X |
|---|---|---|---|
| 3,061,330 | 10/1962 | Alfieri | 280/DIG. 1 |
| 3,608,925 | 9/1971 | Murphy | 280/707 X |
| 3,770,292 | 11/1973 | Palazzetti | 280/708 |
| 3,831,969 | 8/1974 | Lindblom | 280/707 |
| 3,848,862 | 11/1974 | Ito et al. | 280/708 |
| 3,895,816 | 7/1975 | Takahashi et al. | 280/6 H |
| 4,313,529 | 2/1982 | Kato et al. | 280/714 X |
| 4,345,661 | 8/1982 | Nishikawa | 180/141 |

FOREIGN PATENT DOCUMENTS

| 1081549 | 6/1954 | France | 74/498 |
|---|---|---|---|
| 55-55059 | 4/1980 | Japan . | |
| 56-147107 | 11/1981 | Japan . | |
| 2071587 | 9/1981 | United Kingdom | 280/708 |

Primary Examiner—Joseph F. Peters, Jr.
Assistant Examiner—Mitchell J. Hill
Attorney, Agent, or Firm—Fleit, Jacobson, Cohn & Price

[57] ABSTRACT

A motor vehicle including a body, steerable front wheels and rear wheels for supporting the body, front suspension mechanisms between the body and the front wheels and rear suspension mechanisms between the body and the rear wheels, a power steering mechanism for operating the front wheels with desired steering characteristics, the front and rear suspension mechanisms including suspension struts which resist vertical movements of the body with respect to the wheels with damping powers and having spring rates. A control circuit is provided for changing the damping powers and the spring rates in all of the suspension mechanisms and at the same time changing the power assist force of the steering mechanism.

9 Claims, 14 Drawing Figures

SUSPENSION AND STEERING CONTROL OF MOTOR VEHICLES

The present invention relates to motor vehicles and more particularly to motor vehicles having suspension means of variably adjustable characteristics and steering means of variably adjustable characteristics. More specifically, the present invention pertains to control means for such adjustable suspension means and adjustable steering means.

In motor vehicles, suspension mechanisms are employed for supporting the weights of the vehicles and absorbing shock loads which may otherwise be transmitted from ground surfaces to the vehicles. The suspension mechanisms are known as having substantial influences not only on driving comfort, but also on pitching and rolling movements as well as steering stability and maneuverability of the vehicles. It has therefore been considered that the maneuverability of a vehicle can be changed in various ways by changing the characteristics of the suspension mechanisms. For example, in Japanese utility model application No. 54-8394 filed on Jan. 27, 1979 and disclosed for public inspection on July 30, 1980 under the disclosure No. 55-109008, there is proposed a suspension control system in which the absorptive properties of rear shock absorbers are weakened with respect to those of front shock absorbers to provide the vehicle with under-steer characteristics when the vehicle is steered at a high speed. With this control, it is possible to improve steering stability of the vehicle. The utility model application further proposes to weaken the absorptive properties of the front shock absorbers with respect to those of the rear shock absorbers to provide the vehicle with substantially neutral or over-steer characteristics at low speed operation.

In Japanese utility model application No. 55-46386 filed on Apr. 8, 1980 and disclosed for public inspection on Nov. 6, 1981 under the disclosure No. 56-147107, there is proposed means to control the shock absorbers so that their absorptive characteristics are strengthened when the vehicle is steered beyond a predetermined angle at a vehicle speed exceeding a predetermined value. The proposed control is effective to suppress vehicle rolling movements within a certain rate and thereby improve controllability and driving comfort of the vehicle.

With regard to the steering mechanisms of motor vehicles, there have also been various proposals in view of their important influences on the stability and controllability of the vehicles. Recent trends are that power steering devices are widely employed in order to make it easy to steer. Further, various proposals have been made to improve the power steering devices. For example, Japanese patent application No. 53-126368 filed on Oct. 14, 1978 and disclosed for public inspection on Apr. 22, 1980 under the disclosure No. 55-55059 proposes to control hydraulic pumps for power steering systems in accordance with vehicle speeds, loads on steerable wheels and/or resistance force to steering efforts, so that a suitable quantity of hydraulic oil is applied to power cylinders to thereby ensure steering stability.

The aforementioned prior efforts are to make improvements separately in suspension mechanisms and in steering mechanisms and can actually provide certain advantages. It should however be noted that such prior measures for effecting improvements separately in suspension and steering mechanisms cannot always provide satisfactory results because tastes for vehicle performance, such as a riding comfort, controllability and so on, are very different among persons so that one measure does not always comply with each person's demand.

It is therefore an object of the present invention to provide adjusting means in which suspension and steering mechanisms are adjusted with close relationship with each other so that any person can obtain desired controllability, stability and riding comfort.

Another object of the present invention is to provide adjusting means in which all suspension mechanisms can be simultaneously adjusted and the steering mechanism can also be adjusted in relation to the adjustment of the suspension mechanisms.

According to the present invention, the above and other objects can be accomplished by a motor vehicle including a body, wheels for supporting said body and including steerable wheels, a plurality of suspension means between said body and respective ones of said wheels, steering means for operating said steerable wheels with desired steering characteristics, said suspension means including resistance means which provides a resistance to vertical movements of said body with respect to said wheels with desired resistance characteristics, first adjusting means for simultaneously adjusting said resistance characteristics of all of said suspension means to change said resistance characteristics in the same way, second adjusting means for adjusting said steering characteristics of said steering means, control means for providing a control signal having a relation to the adjustment of said resistance characteristics of said suspension means and applying the control signal to the second adjusting means so that the steering characteristics are adjusted with a relation to the adjustment of said resistance characteristics of all of the suspension means.

A suspension mechanism for motor vehicles usually includes damping means having damping characteristics and spring means having a spring rate. In this type of suspension mechanism, the resistance characteristics are determined by the damping characteristics and/or the spring rate so that the resistance characteristics can be changed by adjusting one or both of these factors. In order to make it possible to adjust the spring rate, the spring means may preferably be comprised of an air spring. The air spring may have an air chamber connected through a solenoid valve with a control chamber so that the effective volume of the air chamber can be changed by the operation of the solenoid valve. Alternatively, the suspension means may include an oleo damper having a piston formed with orifice means of adjustable diameter. Such an oleo damper may be used in combination with the above described air spring. Any other means may further or alternatively be used for adjusting the resistance characteristics of the suspension means.

Where a manually operated steering mechanism is employed, the gear ratio of the mechanism may be made variable and the gear ratio may be adjusted by the control means. Where a power assisted steering mechanism is employed, the power assisting characteristics may be adjusted. For that purpose, any known type of adjusting means may be employed. For example, the speed of the hydraulic pump for the power steering mechanism may be adjusted or the quantity of bypass hydraulic liquid may be adjusted.

According to the present invention, the steering characteristics are adjusted with a certain relation to the adjustment of the resistance characteristics of all of the suspension means so that any change in the vehicle controllability due to a change in the resistance characteristics can be strengthened or weakened by a change in the vehicle controllability due to a change in the steering characteristics to thereby obtain desired vehicle maneuvering characteristics. More specifically, an adjustment of the resistance characteristics of all of the suspension means produces a change in the controllability of a vehicle. For example, when the suspension means is adjusted to provide a high spring rate and/or a strong damping power which gives the driver a hard riding feeling, an adjustment of the power steering mechanism for increasing the power assisting force will make the vehicle sharply responsive to a driver's control. Thus, the driver will be given a sporty handling feeling. On the contrary, if the power steering mechanism is adjusted so that the power assisting force is decreased when the resistance characteristics of the suspension means is weakened by decreasing the spring rate and/or damping power, the driver will be given a moderate handling feeling. In a vehicle having a manual steering mechanism, the steering gear ratio may be decreased when the resistance characteristics of the suspension means is increased to provide sporty handling controllability. Further, the steering gear ratio may be increased when the resistance characteristics of the suspension means is decreased to provide solid controllability.

As alternatives, the power assist force of the power steering mechanism may be weakened or the gear ratio of the manual steering mechanism may be increased as the resistance characteristics of the suspension means is strengthened, and the power assist force may be strengthened or the steering gear ratio may be decreased when the resistance characteristics are weakened. In these instances, there will be no abrupt change in the vehicle controllability in response to adjustments in the resistance and steering characteristics. Therefore, these alternatives are suitable for changing the characteristics within relatively small ranges. Such controllability of the vehicle may be determined during manufacture, or the vehicle may be provided with a suitable manual device such as a manual switch so that the driver can select a desired property. It is further possible to adjust the resistance characteristics of the suspension means in accordance with one or more factors representing operating conditions of a vehicle, such as the vehicle speed, the loads on the vehicle and the steering angle. With this arrangement, it becomes possible to provide suitable controllability under any operating conditions. Further, since the resistance characteristics of all suspension means are simultaneously adjusted in the same way, it is possible to maintain the attitude of the vehicle.

The above and other objects and features of the present invention will become apparent from the following descriptions of preferred embodiments taking reference to the accompanying drawings, in which:

FIGS. 4(a), (b) and (c) show signals in the controller;

Figure 1:
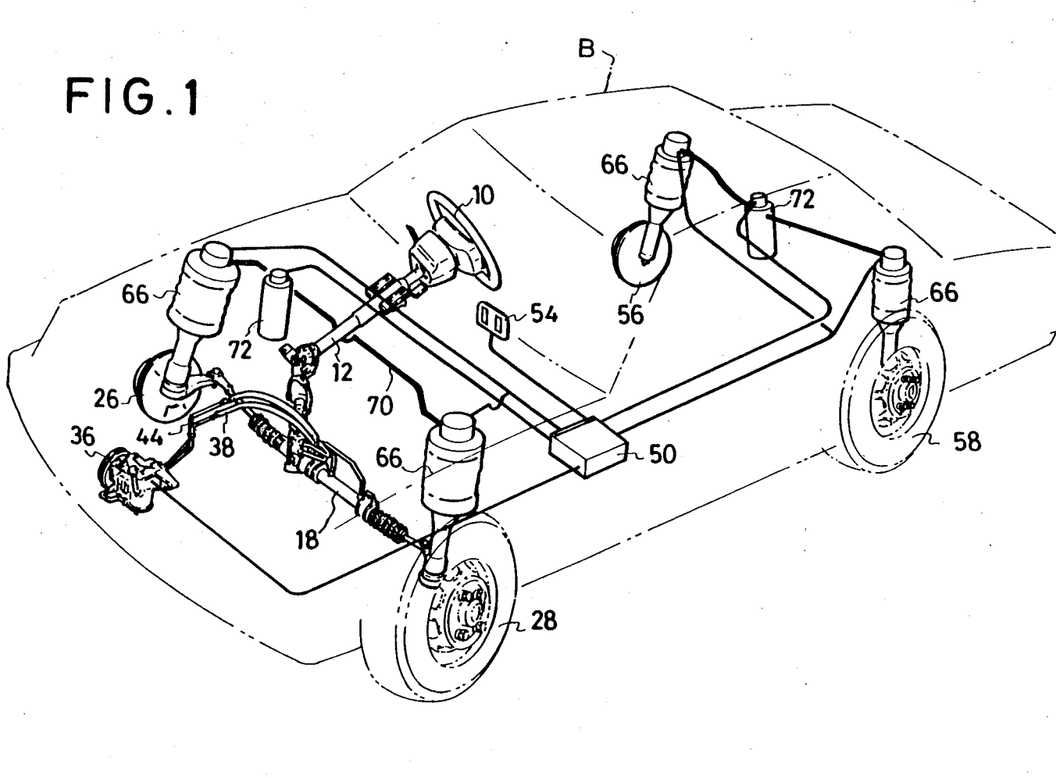
FIG. 1 is a perspective view of a motor vehicle in accordance with one embodiment of the present invention.
Figure 2:
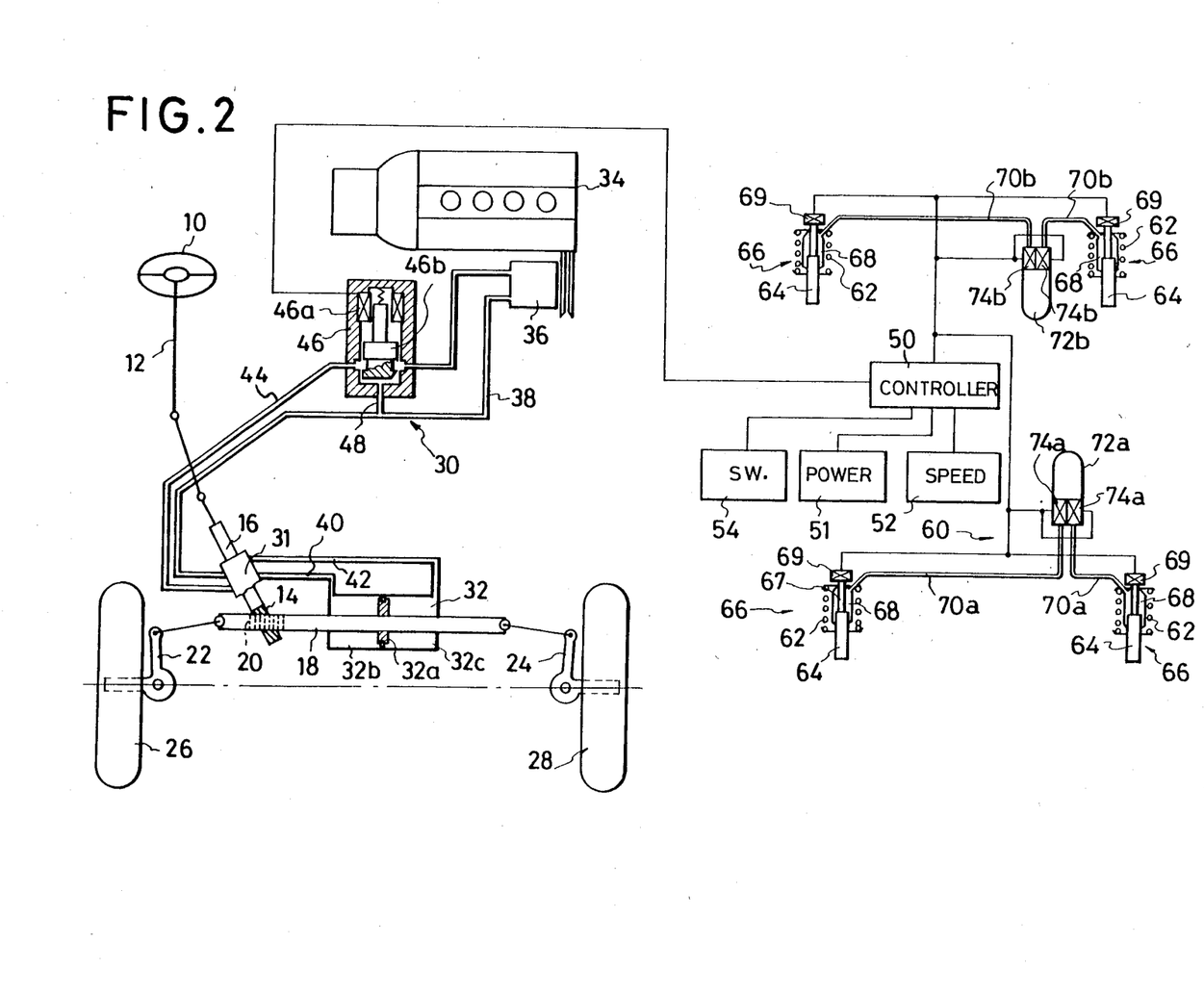
FIG. 2 is a diagrammatical illustration of the suspension and steering adjusting system in the embodiment shown in FIG. 1.

Referring now to the drawings, and particularly to FIGS. 1 and 2, there is shown a motor vehicle having a steering mechanism comprised of a steering wheel 10 connected with a steering shaft 12, which is in turn connected with a pinion shaft 16 formed with a steering pinion 14. The pinion 14 is in meshing engagement with a rack 20 formed on a steering rack shaft 18 which is adapted to be moved in a transverse direction relative to the vehicle in response to rotation of the pinion. The rack shaft 18 is connected at the opposite ends with knuckle arms 22 and 24 provided respectively on steerable front wheels 26 and 28 to transmit steering forces to the wheels.

In order to assist the steering effort, there is provided a hydraulically operated power assist system 30 which includes a control valve 31 provided on the pinion shaft 16 and a power cylinder 32 provided on the rack shaft 18. For providing a supply of hydraulic pressure to the power cylinder 32, there is a hydraulic oil pump 36 driven by an engine 34. The hydraulic pressure from the pump 36 is transmitted through a pressure line 38 to the control valve 31, which functions to selectively transmit the pressure to one of oil passages 40 and 42 in accordance with the direction of rotation of the steering wheel 10. The power cylinder 32 has a power piston 32a which divides the inside of the power cylinder 32 into two oil chambers 32b and 32c and the oil passages 40 and 42 are respectively connected with the chambers 32b and 32c. The control valve 31 further connects the other of the passages to a return line 44 which is connected with a suction port of the pump 36.

In the return line 44, there is provided a solenoid valve 46 which controls the quantity of the hydraulic oil returned to the oil pump 36. Further, the pressure line 38 is connected with the solenoid valve 46 through a bypass line 48. The solenoid valve 46 has a solenoid 46a of a duty factor type for actuating a valve plunger 46b. The solenoid 46a of the valve 46 is connected with a control circuit 50 which is adapted to receive a supply of electric power from a power source 51 and produce a control signal for energizing the solenoid 46a in accordance with signals from a vehicle speed detector 52 and a manual switch 54. The valve plunger 46b is axially shifted by a distance proportional to the electric power applied from the circuit 50 to the solenoid 46a to thereby control the bypass flow through the bypass line 48, and therefore to adjust the hydraulic pressure applied to the power cylinder 32.

In FIG. 1, it will be noted that the vehicle shown therein has a body B and there are provided front suspension mechanisms between the body B and the front wheels 26 and 28. Further, the vehicle has a pair of rear wheels 56 and 58 which also support the body B through rear suspension mechanisms. In FIG. 2, the suspension mechanisms are generally designated by a reference numeral 66 and each front suspension mechanism includes a front shock absorber constituted by a spring 62 and an oleo damper 64. Similarly, each rear suspension mechanism includes a rear shock absorber. Around the damper 64 of each shock absorber, there is formed an air spring 68 which is constituted by a suitable resilient material. Although not shown in the drawing, the oleo damper 64 is of a variable orifice type in which the piston of the damper 64 has an orifice of variable diameter.

In order to control the orifice diameter, there is provided a plunger (not shown) which passes through the piston rod 67 of the damper 64 and is adapted to be rotated about its own axis by a solenoid to decrease the orifice diameter, to thereby increase the damping power. In FIG. 2, the solenoids for the shock absorbers are designated by 69. These solenoids are adapted to be energized by signals from the control circuit 50. The shock absorbers may be of a type disclosed in U.S. Pat. No. 4,313,529.

The air springs 68 for the front suspension dampers 68 are connected through air pipes 70a with a front control air chamber 72a. In order to control the communication between the air pipes 70a and the air chamber 72a, there are provided solenoid valves 74a which are adapted to be energized by a signal from the control circuit 50. Similarly, the air springs 68 for the rear suspension dampers are connected through air pipes 70b with a rear control air chamber 72b and solenoid valves 74b are provided for controlling the communication between the air pipes 70b and the air chamber 72b. The solenoid valves 74a and 74b are such that they are closed when energized to thereby increase the spring rate.

Figure 3:
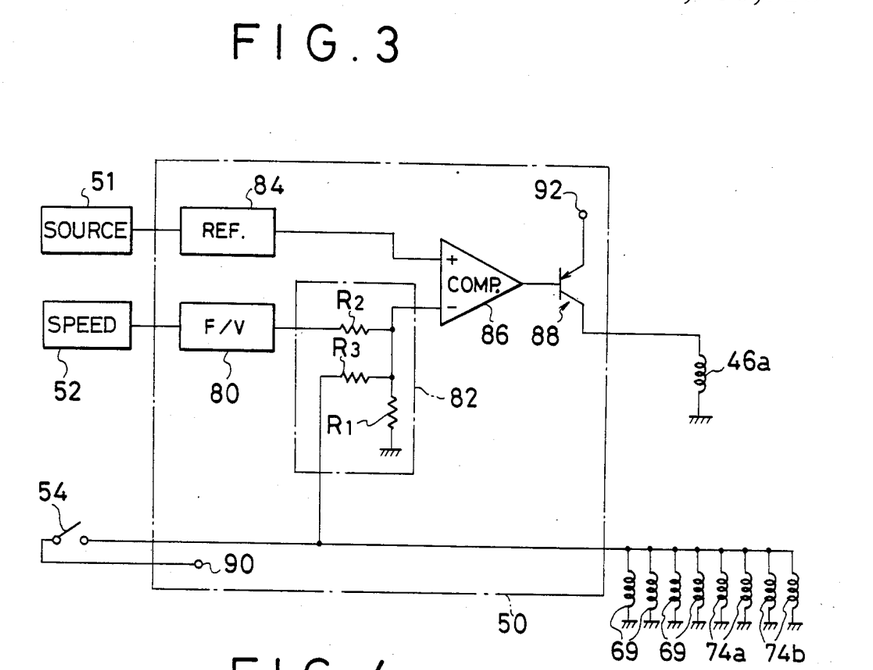
FIG. 3 is a circuit diagram showing the controller used in the embodiment of FIGS. 1 and 2.

Referring to FIG. 3, there are shown details of the control circuit 50. As shown, the control circuit 50 includes a frequency-voltage transducer 80 which is connected with the output of the vehicle speed detector 52 and adapted to produce a voltage signal corresponding to the vehicle speed. The circuit 50 further includes a reference signal circuit 84 which produces a triangular reference signal as shown by line r in FIG. 4(a). The reference signal is applied to a positive input terminal of a comparator 86 whereas the vehicle speed signal is applied through an adding circuit 82 to a negative input terminal of the comparator 86. The adding circuit 82 includes a first resistor R1 which has one end connected with the negative input terminal of the comparator 86, the other end of the resistor R1 being grounded. The adding circuit 82 further includes a second resistor R2 connecting the output of the F/V transducer 80 to the comparator 86. There is also provided a third resistor R3 which has one end connected with the negative input terminal of the comparator 86 and the other end connected through the manual switch 54 with a power supply terminal 90. The switch is also connected with the solenoids 69, 74a and 74b so that these solenoids are energized when the switch 54 is closed.

The comparator 86 has an output connected with the base of PNP type transistor 88 which has an emitter connected with a power supply terminal 92. The collector of the transistor 88 is connected with the solenoid 46a of the steering control solenoid valve 46. Thus, the transistor 88 is turned on when a low level output is produced at the comparator 86 to thereby energize the solenoid 46a.

Figure 4:
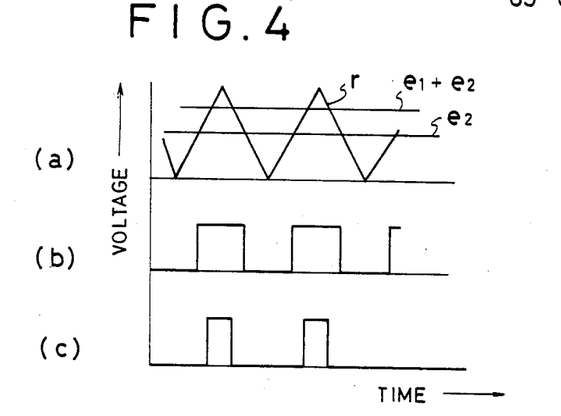
Figure 5:
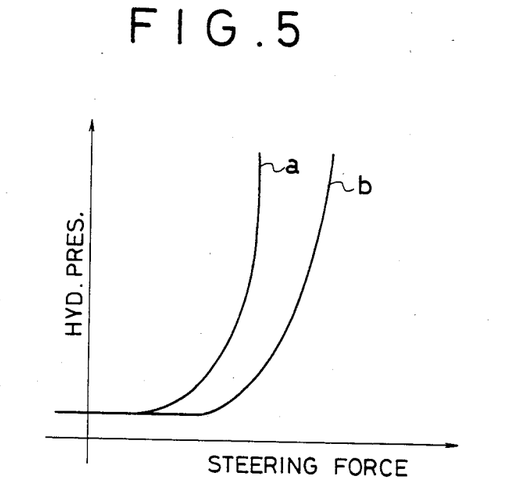
FIG. 5 is a diagram showing the relationship between the hydraulic pressure in the power cylinder and the steering wheel operating torque.

In operation, if the solenoid 46a of the solenoid valve 46 is deenergized, the plunger 46b is maintained at a position in which it closes the bypass line 48 and the return line 44 is opened to the oil pump 36. Thus, a high flow rate is maintained to the power cylinder 32 to provide a high assist force. In the control circuit 50, the transducer 80 produces an output $e_2$, as shown in FIG. 4, which is gradually increased in response to an increase in the vehicle speed. Therefore, the comparator 86 produces an output as shown in FIG. 4(b) and the pulse width of the output is decreased as the vehicle speed is increased. Thus, the solenoid 46a is provided with electric power which increases in response to an increase in the vehicle speed. When the solenoid 46a is energized, the plunger 46b is shifted to open the bypass line 48 and the opening is gradually increased in response to an increase in the vehicle speed. As a result, the hydraulic oil flow through the bypass line 48 is gradually increased. Further, the control valve 31 functions to control the hydraulic pressure applied to the power cylinder 32 in accordance with a change in the steering force as shown in FIG. 5.

Figure 6:
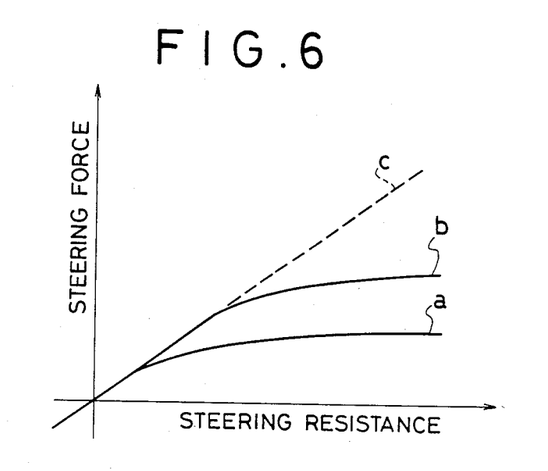
FIG. 6 is a diagram showing the relationship between the steering wheel operating torque and the steering resistance at the road surface.
Figure 7:
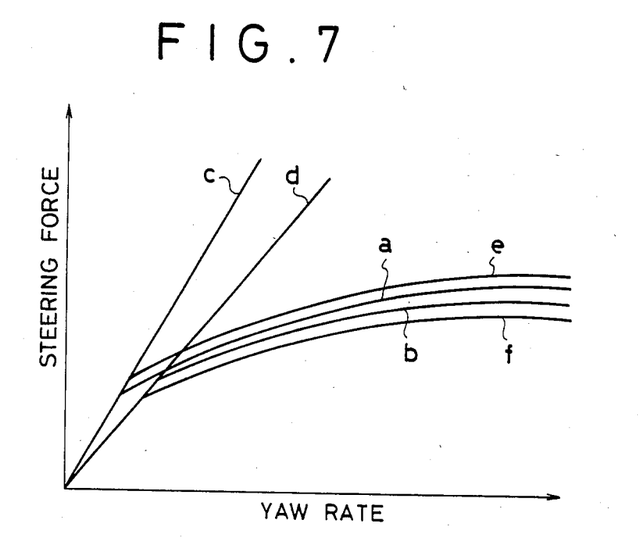
FIG. 7 is a diagram showing the relationship between the steering force and the yaw rate.

When the manual switch 54 is opened, the solenoids 69 in the suspension dampers 64 are all deenergized to provide a relatively weak damping power. At the same time, the solenoid valves 74a and 74b are also deenergized to provide a relatively low spring rate. The manual switch 54 may then be actuated to simultaneously energize the solenoids 69, and the solenoid valves 74a and 74b. Thus, the damping power and the spring rate in the suspension mechanisms are strengthened to provide stronger resistance characteristics. At the same time, the input to the comparator 86 is increased as shown by $e_1 + e_2$ in FIG. 4(a) so that the pulse width of the output of the comparator 86 is decreased as shown in FIG. 4(c). Thus, the output power to the solenoid 46a by the control circuit 50 is increased to move the plunger 46b in the direction of increasing the opening of the bypass line 48 to thereby decrease the hydraulic oil flow to the power cylinder 32. It will therefore be understood that the hydraulic pressure applied to the power cylinder 32 is decreased from a curve a to a curve b in FIG. 5. It will also be understood that the steering effort required for the driver is increased from a curve a to a curve b in FIG. 6. This control will give the vehicle a relatively sharp controllability with a more sporty feel. Thus, it will be understood that the controllability of the vehicle can be changed from a curve b to a curve a in FIG. 7 by actuating the switch 54 from the open position to the closed position.

Alternatively, the arrangement may be such that the output power to the solenoid 46a of the control circuit 50 may be increased when the manual switch 54 is closed. This will cause a change in hydraulic oil pressure to the power cylinder 32, for example from the curve b to the curve a in FIG. 5. For that purpose, the circuit 50 shown in FIG. 3 may be modified so that the output of the reference signal circuit 84 is connected with the negative input terminal of the comparator 86 and the resistors R1, R2 and R3 in the adding circuit 82 with the positive input terminals. Further, the output of the transducer 80 may be connected directly with the negative input terminal of the comparator 86 and the output of the reference signal circuit 84 with the positive input terminal through the adding circuit 82 so that the level of the reference signal is increased when the switch 54 is closed. In a further alternative, the transistor 88 in FIG. 3 may be substituted with an NPN type. With this control, the controllability of the vehicle can be abruptly changed from a curve f to a curve e in FIG. 7 by actuation of the switch 54 from the open to closed position to provide a more sporty feel.

Figure 8:
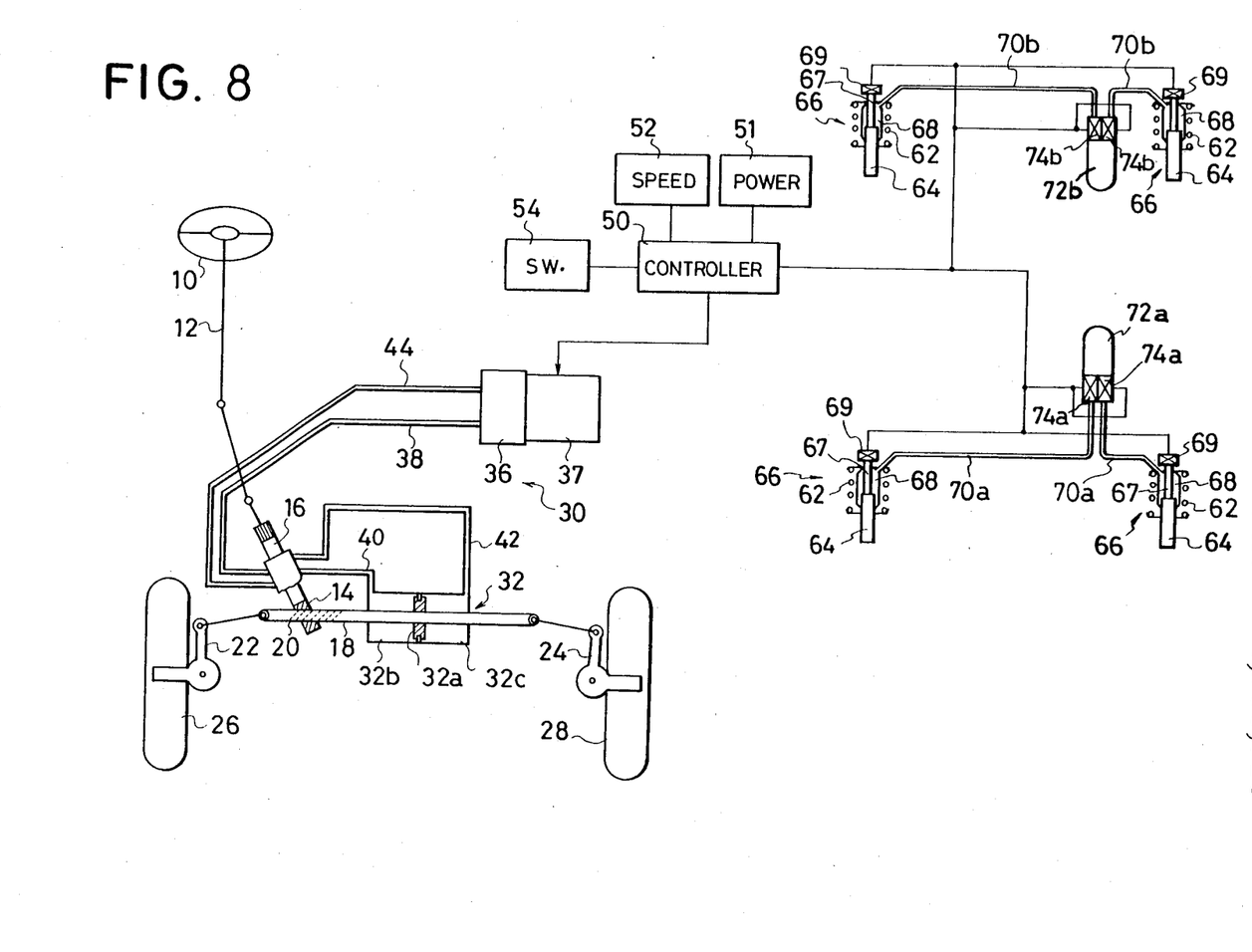
FIG. 8 is a diagrammatical illustration similar to FIG. 2 but showing another embodiment.
Figure 9:
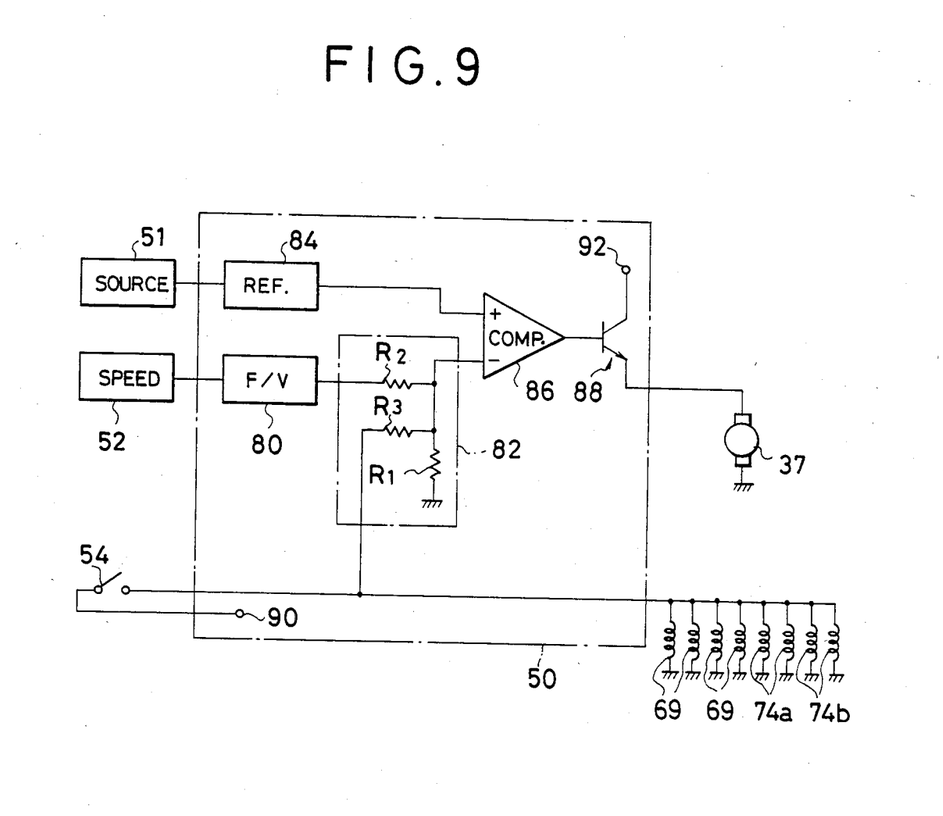
FIG. 9 is a circuit diagram showing the controller in the embodiment of FIG. 8.
Figure 10:
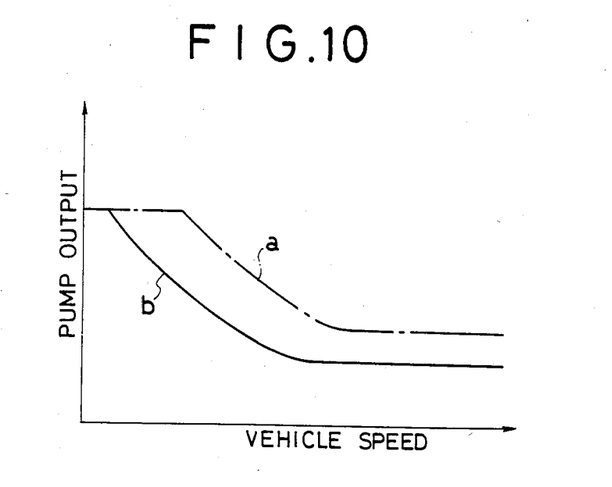
FIG. 10 is a diagram showing the relationship between the vehicle speed and the hydraulic pump output.

Referring to FIG. 8, there is shown another embodiment of the present invention. It will be noted in FIG. 8 that the hydraulic pump 36 is not driven by the engine as in the previous embodiment, but is connected with a motor 37. The controller 50 produces an output for operating the motor 37. The flow rate of the hydraulic oil from the oil pump 36 is controlled by the speed of the driving motor 37, which is in turn determined by the output power of the control circuit 50, which is shown in detail in FIG. 9. In this embodiment, the solenoid valve 46 in the previous embodiment is omitted but the hydraulic oil flow from the pump 36 is controlled by the speed of the motor 37 in accordance with the vehicle speed as shown in FIG. 10. By operating the switch 54, the oil flow can be changed from the curve a to the curve b in FIG. 10 or vice versa. Further, the transistor 88 is of an NPN type in this embodiment. In other respects, the arrangements are the same as in the previous embodiment so that corresponding parts are shown by the same reference numerals as in the previous embodiment and detailed descriptions will be omitted.

Figure 11:
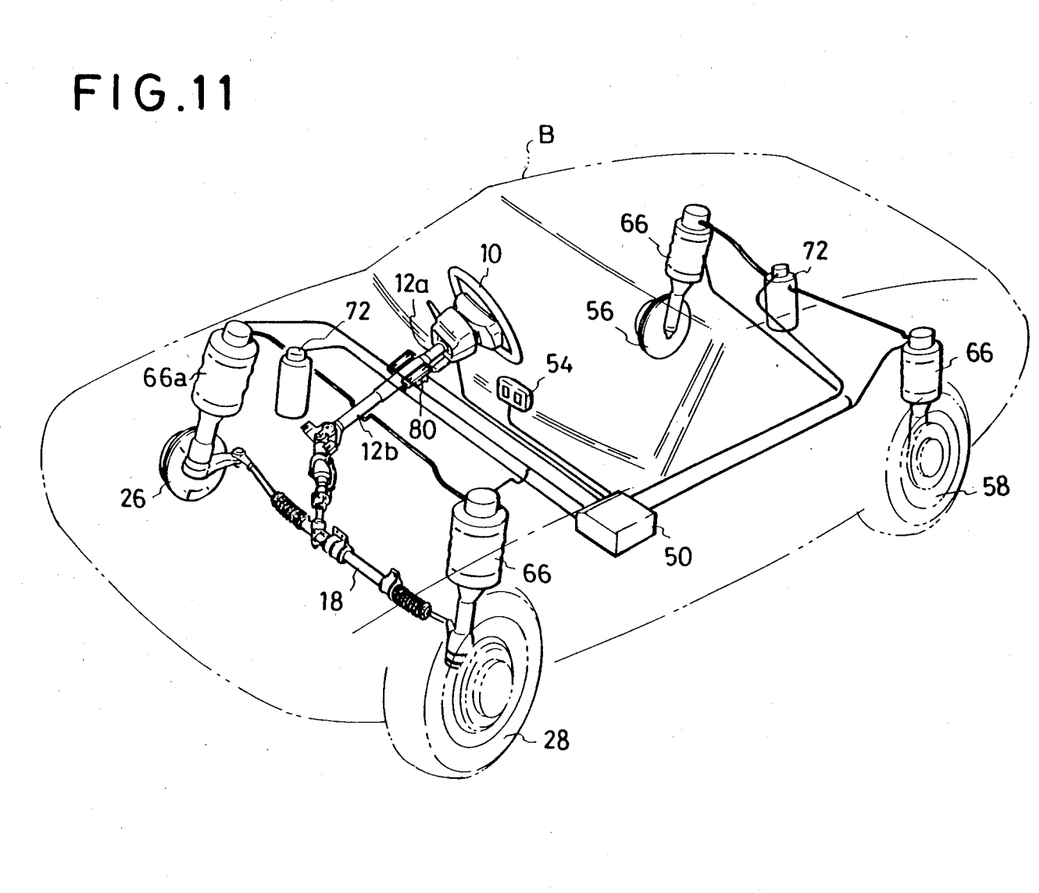
FIG. 11 is a perspective view of a motor vehicle in accordance with another embodiment of the present invention.
Figure 12:
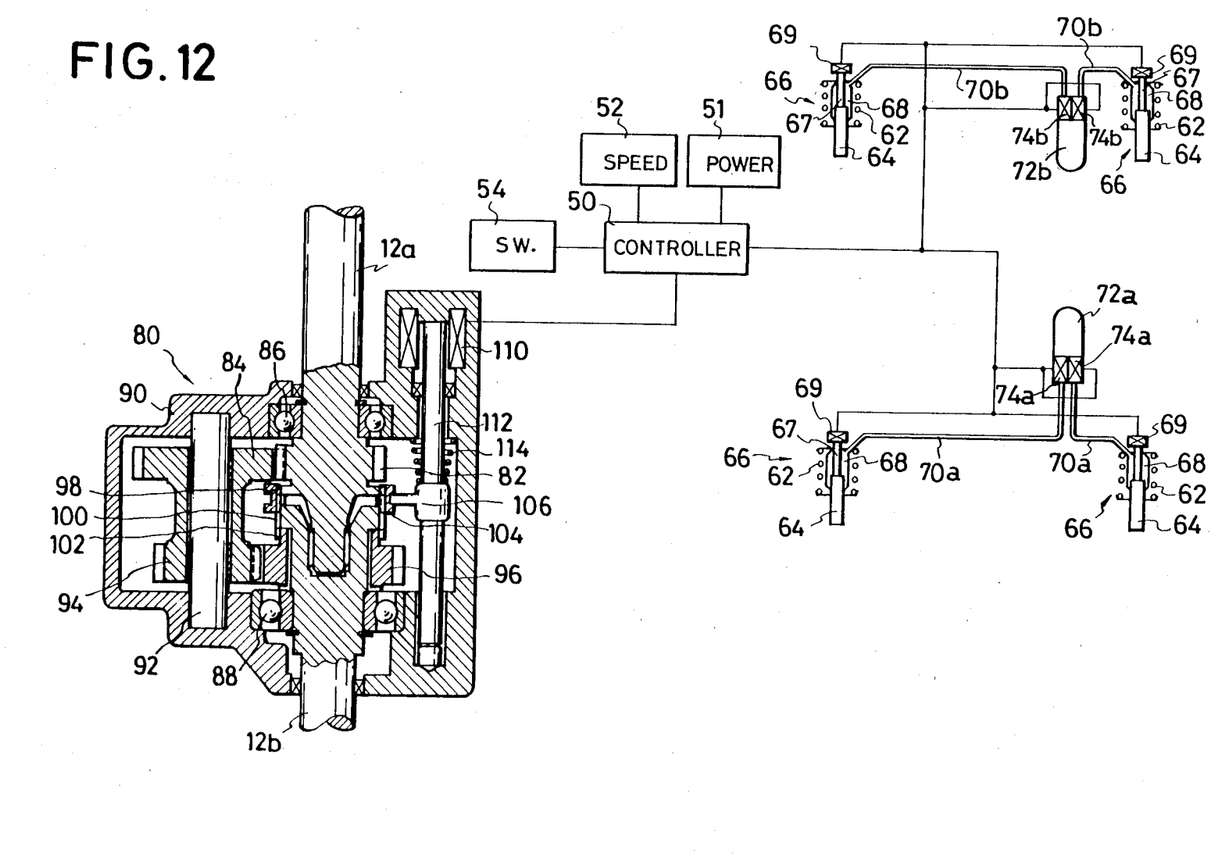
FIG. 12 is a diagrammatical illustration of the suspension and steering control system in the embodiment shown in FIG. 11.

Referring to FIGS. 11 and 12, there is shown another embodiment in which the present invention is applied to a motor vehicle having a manual steering mechanism. In FIG. 11, it will be noted that the steering shaft 12 is divided into an upper shaft portion 12a and a lower shaft portion 12b and there is provided a speed reduction gear mechanism 80. As shown in FIG. 12, the upper shaft portion 12a is formed at its lower end with a gear 82 which is in meshing engagement with an intermediate gear 84 rotatably supported on a casing 90 by a countershaft 92. The shaft portions 12a and 12b are in axial alignment and rotatably carried by the casing 90 respectively through bearings 86 and 88. The intermediate gear 84 is integrally formed with a second intermediate gear 94 which is smaller in diameter than the gear 84. The lower shaft portion 12b rotatably carries a gear 96 which is in meshing engagement with the gear 94.

In order to connect the lower shaft portion 12b alternately with the upper shaft portion 12a and the gear 96, the upper shaft portion 12a is formed at the lower end with axially extending spline teeth 98 and the lower shaft portion 12b with spline teeth 100. Further, the gear 96 is formed with spline teeth 102. An internally splined coupling sleeve 104 is slidably engaged with the spline teeth 100 on the lower shaft portion 12b and movable between a first position wherein the sleeve 104 bridges the spline teeth 98 and 100 and a second position wherein it bridges the spline teeth 100 and 102. It will thus be understood that the lower shaft portion 12b is directly connected with the upper shaft portion 12a when the sleeve 104 is in the first position, and is connected through the gears 84, 94 and 96 when the sleeve 104 is in the second position.

The coupling sleeve 104 is provided with a shift fork 106 which is slidably mounted on a shaft 112. A spring 114 is provided to bias the shift fork 104 toward the second position of the sleeve 104. A solenoid 110 is provided at one end of the shaft 112 so that the shift fork 106 is moved against the function of the spring 114 to shift the coupling sleeve 104 to the first position. The solenoid 110 is connected with the output of the control circuit 50 so that the gear ratio of the steering mechanism is changed when the manual switch 54 is actuated. The control of the suspension mechanisms is the same as in the previous embodiments so that detailed descriptions will be omitted.

The invention has thus been shown and described with reference to specific embodiments, however, it should be noted that the invention is in no way limited to the details of the illustrated arrangements, but changes and modifications may be made within the scope of the appended claims.

We claim:

1. A motor vehicle comprising: a body, wheels for supporting said body and including steerable wheels, a plurality of suspension means between said body and respective ones of said wheels, manually operated steering means for steering said steerable wheels, said suspension means including variable resistance means for providing resistance to vertical movements of said body with respect to said wheels, first adjusting means for simultaneously adjusting the resistance of all of said resistance means to change the resistance in the same way, second adjusting means for adjusting the operating force necessary to operate said steering means, control means for providing a control signal to said first adjusting means for adjusting the resistance of said suspension means and for providing a control signal to the second adjusting means to adjust the operating force necessary to operate said steering means in predetermined relationship to the adjustment of the resistance of all of the suspension means, and switch means operatively connected to said control means for selectively providing desired adjustment of said variable resistance means and desired adjustment of the force necessary to operate said steering means, whereby the vehicle body movement and the steering force required to turn the steerable wheels can be changed by changing the resistance of the suspension means and the operating force necessary to operate the steering means to selectively provide handling characteristics of vehicles having high suspension resistance and requiring high steering operating force or to provide handling characteristics of vehicles having lower suspension resistance and requiring lower steering operating force.

2. A motor vehicle in accordance with claim 1 in which said steering means includes hydraulic means for providing hydraulic assist to reduce the steering force required to operate the steering means, said second adjusting means including hydraulic valve means for changing the effect of said hydraulic means on the steering force.

3. A motor vehicle in accordance with claim 1 in which said variable resistance means include oleo damper means having means for providing variable damping of vehicle body motion relative to said wheels, said first adjusting means including means operatively connected with said oleo damper means for varying the damping effect of said damping means.

4. A motor vehicle in accordance with claim 1 in which said variable resistance means include air spring means respectively having an adjustable spring rate, said first adjusting means having means operatively connected with said air spring means for varying the spring rate of said air spring means.

5. A motor vehicle in accordance with claim 1 which further includes vehicle speed detecting means for providing a vehicle speed signal to said control means, said control means including means responsive to said vehicle speed signal for controlling said second adjusting means in accordance with the vehicle speed.

6. A motor vehicle in accordance with claim 1 in which said steering means includes a steering gear having a variable gear ratio, said second adjusting means including gear shift means operatively connected with said steering gear for changing the gear ratio.

7. A motor vehicle in accordance with claim 1 in which said control means includes means for producing a control signal to said second adjusting means for decreasing the operative force necessary to operate the steering means when the resistance of said suspension means is changed to increase the resistance to the vertical movements of said body with respect to said wheels.

8. A motor vehicle in accordance with claim 1 in which said control means includes means for producing a control signal to said second adjusting means for increasing the operative force necessary to operate the steering means when the resistance of said suspension means is changed to increase the resistance to the vertical movements of said body with respect to said wheels.

9. A motor vehicle in accordance with claim 1 in which said switch means includes a manually operated, two-position switch.

* * * * *